Jan. 8, 1963

J. A. HULTQUIST 3,072,411

AUTOMATIC STOP MECHANISM

Filed April 29, 1953

3 Sheets-Sheet 1

INVENTOR
J. ALBERT HULTQUIST
BY Michael Hertz
ATTORNEY

INVENTOR
J. ALBERT HULTQUIST
BY Michael Hertz
ATTORNEY

INVENTOR
J. ALBERT HULTQUIST
BY Michael Hertz
ATTORNEY 3,072,411
AUTOMATIC STOP MECHANISM
J. Albert Hultquist, Scarsdale, N.Y., assignor, by mesne assignments, to Sylvania Electric Products Inc., Wilmington, Del., a corporation of Delaware
Filed Apr. 29, 1953, Ser. No. 351,785
20 Claims. (Cl. 274—10)

This invention relates to means for stopping an automatic record changer type of phonoplayer.

The invention is particularly adapted to the type of record player in which a record centering post is provided at its upper end with means to support a stack of records and to sequentially feed them to the turntable.

It is an object of this invention to incorporate with such type of phonoplayer a simple turntable stop mechanism.

It is a further object of the invention to so stop the mechanism that the tone arm will be out of the way of the records on the turntable, so that they can be removed without the necessity of manually displacing the tone arm.

It is a further object of this invention to coordinate the functioning of the stop mechanism with a means to hold a record being played in non-slipping playing position.

These and other objects will become apparent after reading the following specification in connection with the accompanying drawings in which FIG. 1 is a vertical section through a phono turntable and post embodying my invention and disclosing several records on the turntable and others in position on the post to be sequentially dropped onto the records below.

Figure 1:
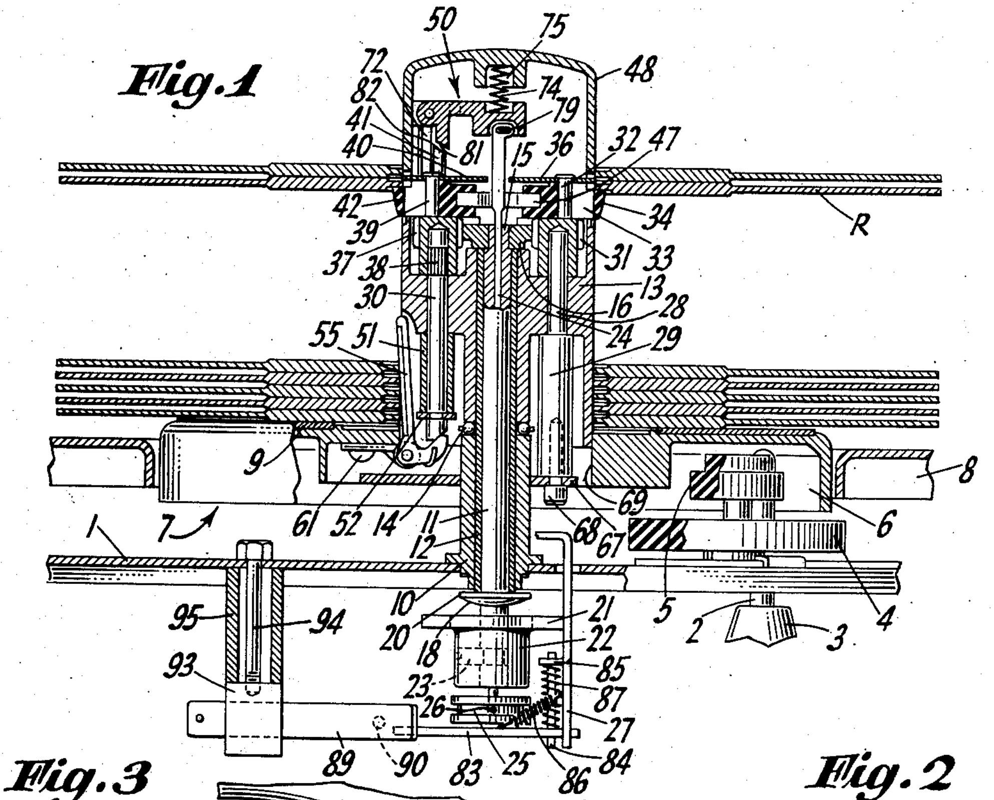
Figure 3:
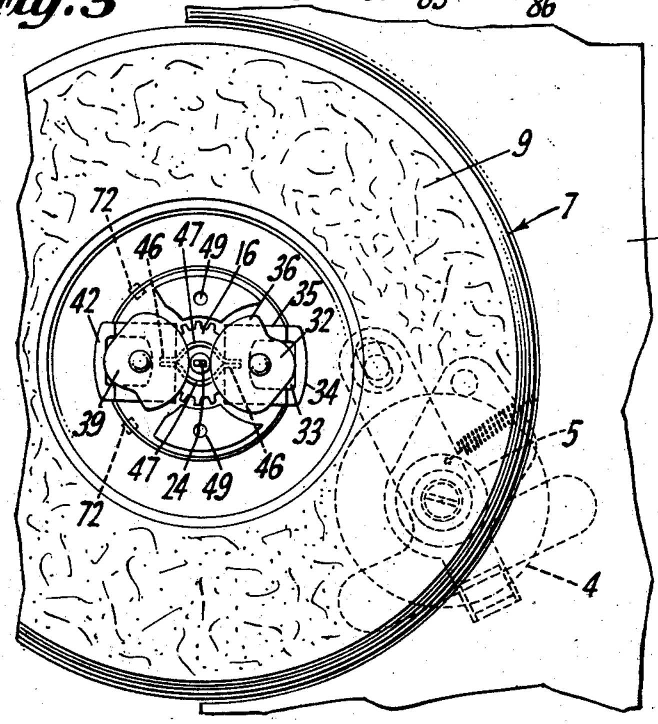
FIG. 3 is a fragmentary plan view of the turntable and its record receiving post with the cap of the post removed to show interior construction, a portion of the motor drive for the turntable being shown in dotted lines.
Figure 2:
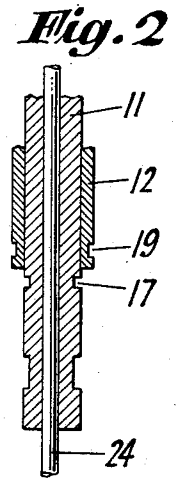
FIG. 2 is a detail view of the lower end of a record release and friction disc control shaft and its sleeve, and the centrally located phono motor stop control rod.

Referring to the drawings in greater detail there is shown a portion of a phonoplayer comprising a base plate 1 supporting a motor driven spindle 2 extending through a motor housing portion 3, this spindle driving a friction ring 4. Fast with the ring 4 is a smaller turntable friction drive ring 5 engaging the inner surface of a flange member 6 depending from the turntable 7. Surrounding the turntable and enclosing operating mechanism of the changer is the housing 8. This is conventional structure and needs no greater detail of description. The turntable is usually covered with felt 9 or other non-slip material. Supported by the base plate is a turntable support pedestal and bearing member 10. Mounted for rotation in the pedestal 10 is a record release and friction control shaft 11. This shaft is hollow and rotates within a bushing or sleeve 12 driven into a turntable post 13, said turntable post being fast to the turntable 7 so as to rotate therewith. The lower end of the bushing extends beyond the lower end of the post 13 and is snugly but rotatably received in the pedestal 10. The turntable and post are non-frictionally supported on the pedestal through the intermediary of an end thrust roller bearing 14 encircling the sleeve 12 and interposed between pedestal 10 and post 13.

At the upper end of the shaft 11 is a reduced portion 15 to which is secured in driving relation a gear 16. The lower end of the shaft is provided with a recessed grooved portion 17 accomodating a curved C shaped spring washer 18, this washer serving to prevent shaft withdrawal upwardly through the sleeve. Likewise, the lower end of the sleeve is grooved at 19, and receives a flat C shaped washer 20 to prevent unintentional withdrawal of the turn table post and turntable from its pedestal. The lower end of the shaft 11 also has secured to it a star wheel 21. The star wheel has a collar 22 secured to the shaft 11 by suitable set screws 23. Extending centrally through the shaft 11 is a motor switch control rod 24 provided at its lower end with a switch control spool 25 suitably fastened to the control rod by a set screw 26. The parts cooperating with the rod and disc will be described later on. Cooperating with the star wheel is an oscillatable star wheel rotation arresting member 27 which member is coordinated with the operation of the changer to effect relative rotation of the shaft 11 with respect to the turntable upon the tone arm approaching close to the post, to effect release of a record from the storage pile onto the turntable, all as the tone arm is shifted out of the way and then onto the new record. The mechanism to shift the tone arm and coordinately release a disc is old in the art and therefore will not further be described here.

Within the post 13 is a fixed pin 28 having an enlarged portion 29 and also there is a rotatable shaft 30. The pin and shaft are each surmounted by a gear meshing with the gear 16. The gear 31 is rotatable about the pin 28 and carries at its upper end an eccentric pin 32 riding in an elongated slot 33 of a displaceable record support ledge member 34, this ledge member being guided for rectilinear movement in a transverse channel 35 formed in the upper end of the post from a position projecting beyond the post 13 to a position within the perimeter thereof. The slot in the ledge member is wider than the diameter of the eccentric pin in a direction longitudinally of the length of the passageway in the post. Rigidly secured to the upper end of the eccentric pin as by peening of the pin is a thin cam shaped separator knife disc 36 so shaped and positioned relative to the ledge member that when the ledge member is in projected position relative to the post 13, the knife disc is retracted and vice versa.

On the rotatable shaft 30 is mounted a gear 37 fixed against rotation thereon by means of fluted surfaces 38 on the shaft and within the gear. This gear provides a mount for an eccentric pin 39 and separator knife disc 40 as well as a stop control cam pin 41, the pin 39 and disc 40 being similar to the eccentric pin and knife disc on the companion gear 31. The gear 37, eccentric pin 39, and cam pin 41 may all be of molded material; the knife disc 40 may be integrated with the other parts during the molding operation. Cam pin 41 is so molded as to be concentric with the axis of gear 37. The eccentric pin 39 operates a ledge member 42 similar to the ledge member 34. However, with respect to the ledge member controlled by the pin 39, the same is made of two parts 43 and 44 to enable assembly of the same about the pin, the two parts being joined by suitable fastening means, as screws 45. Interposed between the two ledge members 34 and 42 and mounted in two opposing elongated slots 46 in these members is a pair of bowed springs 47, tending to thrust the ledge members so that the ledge supporting edges thereof are outwardly of the post. The parts are mounted on the post so that upon partial rotation of the shaft 11, both ledge members 34 and 42 will be drawn inwardly together by the eccentric pins 32 and 39 to release a record R while in the meantime the disc members 36 and 40 have knifed their way between the lowermost record and the one immediately thereabove to support the records above the knife discs. Further rotation of the shaft 11 again permits the ledge members to be projected beneath the record discs just supported by the knife discs, while the knife discs are rotated to a record disc non-supporting position. Play longitudinally of the post passageway between the eccentric pins and the ledge members is provided to permit the springs to yieldingly urge the ledge members to their projected positions, rather than to cause the members to be positively moved by the pins, to prevent breakage of the record discs should the record discs not be in proper position when the ledge members are projected.

A cap 48 is secured to the post by means of screws passing through holes 49 in the post which register with threaded holes 49*a* in the cap. This cap pivotally supports a record sensing mechanism 50 to be later described.

As pointed out heretofore, when a number of disc records have piled up on the turntable, the top record, the one being played, is apt to slip with respect to the turntable thereby affecting the quality of reproduction of the transcription. It is to avoid this that the following provisions have been made.

Figure 4:
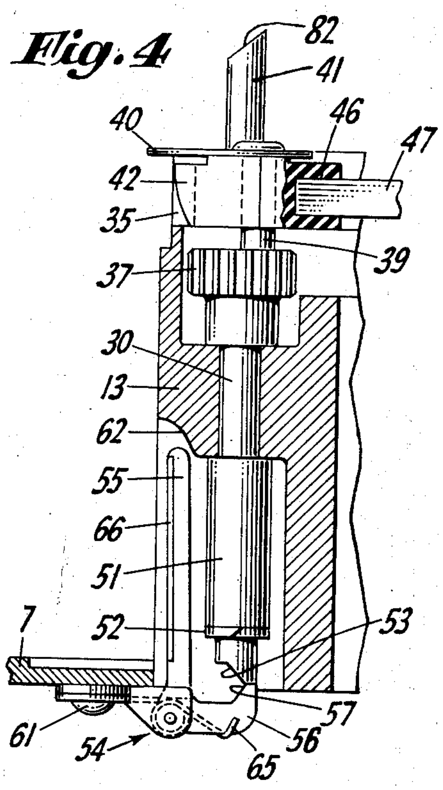
FIG. 4 is a vertical section through a portion of the means employed to restrain rotation of the record discs relative to the turntable and post and to control stoppage of the turntable.

As pointed out heretofore, the shaft 30 is rotated upon rotation of the shaft 11 relative to the turntable by reason of the meshed gears 16 and 37 and by reason of the gear 37 being mounted on shaft 30 for rotation therewith. The lower end of shaft 30 extends through a sleeve 51 and is provided with a recessed portion to accommodate a C washer 52 to prevent upward withdrawal of the shaft 30. Downward withdrawal of the shaft is resisted by the tight fit of the gear 37 on the upper fluted portion of the shaft. The lower end of the shaft is provided with a bevelled surface 53 in a plane at approximately 45° to the longitudinal axis of the shaft. Cooperating with this bevelled end of the shaft is a bell crank lever 54. This bell crank lever has two arms 55 and 56 integral with a sleeve portion 57 mounted on a pintle 58 extending between two ears 59, 59 bent at right angles to a base plate 60, said plate being secured to the under side of the turntable by screws 61. The shorter arm 56 of the bell crank has a bevelled face 57 adapted to cooperate with the bevelled face 53 on the lower end of shaft 30. The longer arm or brake shoe or brake finger projects upwardly and, when the bevelled faces are related as shown in FIG. 4, lies within a recess 62 in the wall of the post to permit records to drop unrestrained onto the turntable or onto records piled thereon. When, however, the shaft 30 is rotated through 180° from the position shown in FIG. 4, the brake shoe or finger 55 is free to move outwardly of the recess. To move the shoe outwardly and to cause the same to resiliently restrain a record from rotating at a different speed from that of the turntable, a spring 63 is coiled around the sleeve of the bell crank lever with one end 64 bearing against the base plate and the other end 65 hooked under and reacting against the short arm of the lever. The bevel 53 on the shaft 30 is so located that when the eccentric pin 39 has withdrawn the ledge member 42, the lowermost point of the bevel 53 is engaging the arm 56 to withdraw the brake shoe 55 into the recess, all as shown in FIG. 4. When the ledge member 42 is projected, however, the bevelled shaft 30 is in the position shown in FIG. 1 and the coil spring is then free to urge the shoe 55 outwardly into frictional engagement with the edge of the hole in the record disc. The disc engaging face of the brake shoe is preferably lined with antifriction material, as indicated at 66. Due to the slight inclination of the disc engaging surface of the brake shoe when it is in the operative position of FIG. 1, the shoe is most effective on the topmost record disc in playing position.

A plate 67 rotatable with respect to the support member 10 underlies the post portion of the turntable and is held in place by means of a screw 68 engaging a threaded recess in the lower end 29 of the pin 28. This plate in cooperation with a cam 69 on the lower face of the turntable guides an upstanding cam follower pin on the arm 27. This structure and associated tone arm moving mechanism is not shown since it is conventional in record changers of this type and the detailed construction is not necessary to an understanding of this invention.

So far, in the main, the structure and operation of the means for restraining slip of the record being played has been disclosed. Attention is now directed to the phono-stop mechanism. This mechanism is related to the mechanism heretofore described in a manner which will soon be apparent. The phono-stop mechanism includes the control shaft 24 with its disc 25 and the sensing mechanism 50 in the cap. The sensing mechanism comprises a bell crank lever pivoted at 70 to suitable ears 71 in the cap and having record feeler fingers or tines 72 projectable outwardly of the cap through slots 73 in the side of the cap. These fingers straddle the ledge member 42 and its associated knife disc 40. The feeler is urged to engage the wall of a central opening in a record disc supported by the ledge members by a coil spring 74 seated in a suitable recess 75 in the cap and in another recess 76 in the bell crank lever. The horizontal arm 77 of the lever has an elongated recessed portion 78 in the bottom thereof within which is somewhat loosely pivoted the rod 24 as by a pin 79 driven through the arm 77 and engaging loosely within an apertured portion at the upper end of the rod. The arm 77 also has a downwardly projecting cam pin 80 having a cam surface 81 adapted to cooperate with a cam suface 82 on the pin 41. The fingers 72, cam pin 80, rod 24 and disc 25 are all connected for conjoint movement.

The spool 25 is adapted to cooperate with a slidable fulcrum lever 83 pivotally mounted on a pin 84, the pin being mounted on a ledge 85 bent to a horizontal position out of the lower end of the star wheel rotation arresting member 27. To maintain the lever 83 at substantially a right angle to the vertical face of the member 27, a pair of light coil springs 86 is provided, each coil spring at one end being secured to the lever 83 about midway of its length and to the member 27 at a point displaced from the pivot pin 84 of the lever 83. The lever 83 is free to slide up and down on the pin 84 but is urged toward the lowermost free headed end of the pin by a spring 87. The arm 27, as is well known in the art, for each change of record disc operates through a single complete oscillating cycle under control of the cam 69 on the bottom of the turntable, this cycle involving a displacement of the star wheel arresting arm 27 from the position shown in dotted lines at A in FIG. 6 to position B and back again to A. The cam under the turntable is so contoured that the arm 27 engages the star wheel 21 for substantially 270° of rotation of the turntable during which time, because of the gear ratio existing between gears 16 and 31, and between gears 16 and 37, the gears 31 and 37 make a complete 360° revolution. During this complete cycle of movement of arm 27, the tone arm will be oscillated completely out of the path of the record sliding down the post and back again into lowered position onto a position close to the edge of the now lowered record. The interrelationship of turntable movement, tone arm movement and star wheel rotation arresting is not part of applicant's invention and therefore need not be described in greater detail. Its construction can be more fully understood, if so desired, by referring to RCA 45 r.p.m. record player, Model No. 45J.

Normally with records on the ledge members 42 and 34, the fingers 72 will be held substantially vertical by the wall surrounding the central aperture in the lowermost record; the rod 24 and spool 25 will, therefore, be held raised. The relative horizontal levels of spool 25 and lever 83 at this time are such that the lever is free to move beneath the spool 25 during the cycling of the arm 27 and so long as any records are on the ledge members 34 and 42. When, however, the last record of a stack has been dropped to playing position, the tines 72 can swing outwardly far enough to permit the spool 25 to be dropped. However, at this time the lever is beneath the spool and it is only at the end of this cycle, when the arm 27 moves from position B to position A that the spool is free to move down into the path of movement of the lever. When so free to move, the spring 74 is effective to pivot the sensing member 50 until cam surface 81 abuts cam surface 82. After the last record on the turntable has been played, the arm 27 starts to cycle; lever 83 engages a groove 88 in the peripheral wall of spool 25 and, as it continues to move, slides along the groove thus effecting a pivoting movement of the lever 83 about its pivot 84. This pivotal movement coupled with the movement of the arm 27 is effective to open the motor switch, as will be described.

In the path of movement of the free end of lever 83 is the resilient movable contact arm 89, this arm carrying a contact 90 cooperating with a contact 91 on a relatively fixed arm 92, the contact arms being insulated from each other by the insulating block 93. The switch is supported from the base plate 1 by a suitable bolt 94 threaded into the insulating block 93, suitable spacing between switch and plate being maintained by a sleeve member 95.

Figure 6:
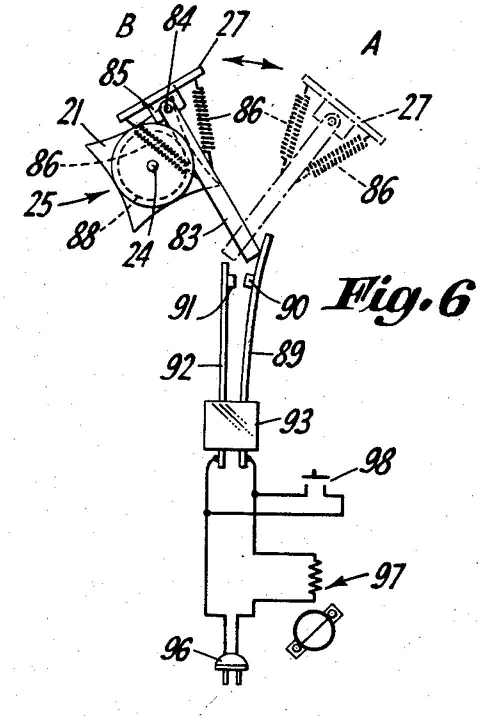
FIG. 6 is a view, partly diagrammatic, showing motor switch control mechanism.
Figure 5:
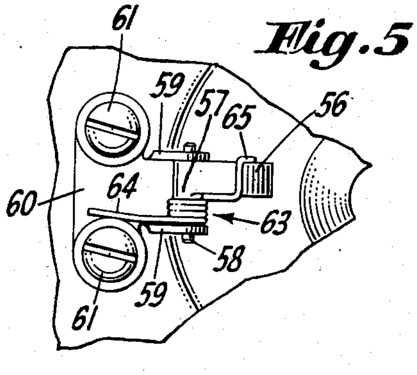
FIG. 5 is a bottom view of the portion shown in FIG. 4.
Figure 7:
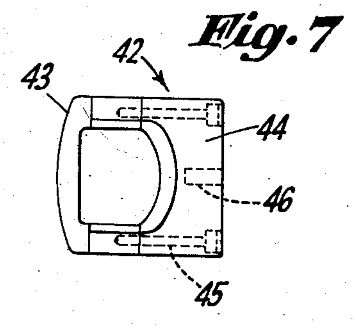
FIG. 7 is a plan view of a ledge member.
Figure 8:
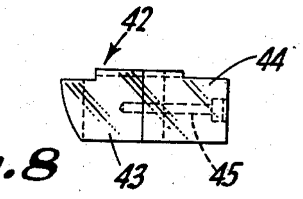
FIG. 8 is a side elevation of the ledge member shown in FIG. 7.
Figure 9:
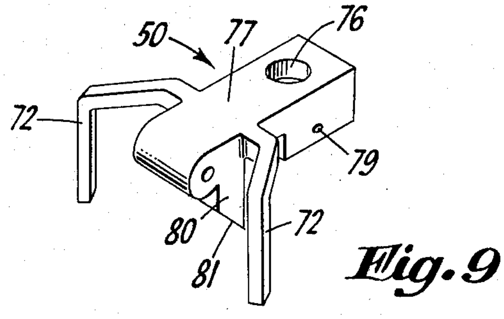
FIG. 9 is a perspective view of the record sensing fingers and associated parts.
Figure 10:
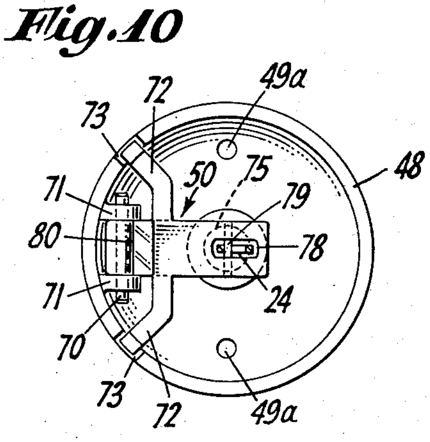
FIG. 10 is a bottom view of the cap with sensing finger supported thereby.
Figure 11:
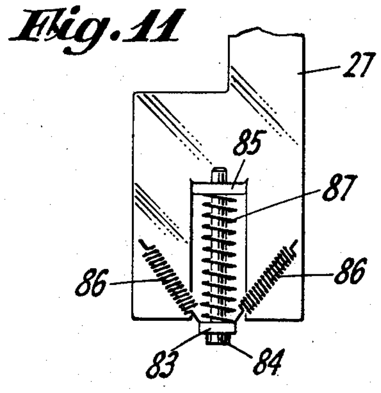
FIG. 11 is a face view of a star wheel rotation arresting and phonomotor stop member.

The switch is wired to a plug 96 and motor 97, as shown in FIG. 6. In shunt with switch contacts 90 and 91 is a second manually operated push button switch 98.

The complete operation of the device is as follows:

It is to be assumed that the parts have stopped with the arm 27 just reaching contact with the star wheel 21 and with the feelers 72 projected so that the spool 25 and lever 83 are down and the lever 83 is engaged in the groove of spool 25 and is in a position to maintain switch contacts 90 and 91 separated; let it further be assumed that there are no records on the post. With parts in this assumed position, a stack of records is loaded on the post, and comes to rest with the lowermost record on the ledge members 42, 34. In doing so, the feelers 72, 72 are pressed inwardly of the post, thus effecting a raising of the rod 24 and spool 25. Due, however, to the grooved construction of the spool, the lever 83 is pulled upwardly along with the spool, the lever sliding along the pin 84 against the action of spring 87, yet maintaining the switch contacts 90 and 91 separated.

Upon depressing push button switch 98, the contacts 90, 91 are short-circuited and the motor 97 is started. The parts now complete the cycle previously left incomplete by previous opening of the switch 90, 91 by action of the lever 83. Since arm 27 is engaged with the star wheel 21, rotation of the turntable 7 effected by the motor causes the post 13 to rotate carrying the gears 37 and 31 as planetary gears around the now stationary sun gear 16. The rotation of gears 37 and 31 causes rotation of the eccentric pins 39 and 32 to effect withdrawal of the ledge members 42 and 34 to permit the lowermost record of a stack to be dropped onto the turntable. While the ledge members are being withdrawn, the knife discs 40 and 36 are being projected so as to underlie the penultimate disc to prevent the entire stack from dropping onto the turntable. It should be noted that during the retraction of the ledge members, the cam surfaces 82 and 53 had withdrawn the feelers 72, 72 and the friction finger 55, so that no resistance was offered to the movement of the records. During continued cycling of the mechanism, the knife discs are withdrawn and the ledge members are released by the eccentric pins to the action of the bowed leaf springs 47. Also, the cams 82 and 53 are so turned as to permit the sensing element and the friction element to move outwardly of the post, the sensing fingers being prevented from moving to too great an extent by engagement of the fingers with the inner walls of a record disc supported either by the knife discs or by the ledge members. During the final portion of the cycle, the arm 27 is released from the action of the cam 69 on the under portion of the turntable, and moves from position B to position A, thereby permitting switch contacts 90, 91 to close. Also, the lever 83 is shifted downwardly toward the outermost end of the pin 84 by action of the spring 87. Thereafter push button 98 may be released. In the meantime, the tone arm has moved from a position where it had been furthermost removed from the record onto the initial groove of the record. Further rotation of the turntable causes reproduction of the record. At an appropriate time in the approach of the tone arm toward the post, the arm 27 is brought into contact with the cam 69 in a manner previously known in the art. The movement of the arm 27 into the path of the cam causes a portion of the arm 27, upon further rotation of the turntable, to move into the path of the star wheel 21 and arrest its rotation. Thereupon the ledge members are withdrawn, the knife discs projected, and the sensing member and friction finger retracted, all as previously explained. However, since there are records supported by the ledge members or knife discs, the spool 25 is not permitted to drop sufficiently so as to be in the path of movement of the lever 83. As a result, the lever 83 is swept beneath the spool 25 and, toward the end of the cycling, is moved away from the spool without effecting operation of the switch. Thus the machine cycles until the last record is released from off the ledge members. Now the feelers 72 are free to move outwardly, but again the spool 25 is ineffective to produce switch opening movement because the lever 83 is beneath the spool in the cycling of parts before the spool is forced downwardly by the action of spring 74. Therefore, the cycle continues as heretofore, allowing the last record to be played. However, in the last part of the previous cycle, as the arm 27 moves from position B to position A, the lever moves away from beneath the spool so that it is permitted to drop; the spool is now within the path of movement of the lever 83 when it next attempts to move from position A to position B. Upon the initiation of the next cycle, the lever 83 approaches the spool 25 and engages within the groove 88 thereof. Continued motion of the arm 27 causes the lever 83 to pivot and slide along the periphery of the spool so that the free end of the lever 83 engages the leaf spring 89 to separate the contacts and effect stopping of the machine. The records may now be stripped off the post. In doing so, it is necessary to depress the feelers 72, 72. However, due to the vertical sliding action of the lever 83 along its pivot pin 84 enforced by the groove in the spool and the width of the leaf spring 89, the switch is still maintained open. When the feelers are again released the spool and lever 83 move downwardly, with the switch contacts still open. This is the position of parts assumed to be existant at the beginning of the description of operation of the parts. The parts now again operate as previously described.

Having thus described my invention, what I claim is:

1. In a phonograph player of the automatic record disc changer type, a turntable having a central post affixed thereto, drive means for rotating the turntable and post, record dispensing means at the upper end of the post rotatable therewith, means for sensing records at the upper end of the post, and means operative at the end of playing a record, and in response to the sensing means sensing the absence of any records at the upper end of the post, for stopping the drive means.

2. In a phonograph player of the automatic record disc changer type, a turntable having a central post affixed thereto, drive means for rotating the turntable and post, record dispensing means at the upper end of the post rotatable therewith, means comprising an element extending vertically through the post for sensing records at the upper end of the post, and means at the lower end of the element operative at the end of playing a record, and in response to the sensing means sensing the absence of any records at the upper end of the post, for controlling the stopping of the drive means.

3. In a phonograph of the automatic record disc changer type, a turntable having a vertical post having record supporting and dispensing mechanism at the upper end thereof, means for driving said turntable, a hollow shaft extending centrally vertically through the post, said shaft being normally free to rotate with the post, means connected with the upper end of said hollow shaft and operative when the shaft is fixed against rotation with the turntable to operate said dispensing mechanism, means at the lower end of the hollow shaft operative to restrain rotation of the shaft, record sensing means at the upper end of said post, control means for said driving means at the lower end of said post, and means including an element connected with said sensing means extending through said hollow shaft in position to operate said control means.

4. In a phonograph player of the automatic record disc changer type, a turntable having a central post, drive means for rotating the turntable, record dispensing means at the upper end of the turntable, means comprising an element extending vertically through the post for sensing records at the upper end of the post, control means at the lower end of the element for effecting stoppage of the drive means, means operative conjointly with each dispensing operation to move the sensing means out of engagement with a record and to render the control means ineffective, and means biasing said sensing means towards a record and the control means toward effective position, the actual movement of the control means into the effective position being inhibited by engagement of the sensing means with a record.

5. In a phonograph of the automatic record disc changer type, a turntable having a central post, drive means for rotating the turntable, a cycling control means for said drive means operative below the post, record dispensing means at the upper end of the post, means for sensing records at the upper end of the post, means extending through the post connected at the upper end to the sensing means and having abutment means at the lower end adapted to cooperate with said drive control means, said abutment means being out of the path of movement of the cycling control means so long as the sensing means finds any records at the upper end of the post, and biasing means for moving the abutment means into the path of cycling movement of the control means upon the absence of records at the upper end of the post.

6. In a phonograph of the automatic record disc changer type wherein the records have central apertures, a turntable having a central post, drive means for rotating the turntable, a cycling control means for said drive means operative below the post, said control means being set into operation at the end of each playing of a record, record dispensing means at the upper end of the post, means at the upper end of the post for sensing records thereat by engagement with the walls of the central apertures, means extending through the post connected at the upper end to the sensing means and having abutment means at the lower end adapted to cooperate with said cycling control means, said abutment means being maintained out of the path of movement of the cycling control means by engagement of said sensing means with a record, means operative during each cycling movement of the cycling control means to move the sensing means away from the wall defining a record disc aperture and to raise the abutment means, and means for biasing said sensing means against a record disc wall and simultaneously biasing the abutment means toward the path of movement of the cycling control means, said abutment means being actually movable into the path of the cycling control means upon the absence of a record in the path of movement of the sensing means and during the continued cycling movement of the drive control means.

7. In a phonograph of the automatic record disc changer type wherein the records each have a central aperture, a turntable having a central post, drive means for rotating the turntable, a cycling control means for said drive means operative below the post, said control means being set into operation at the end of each playing of a record, record dispensing means at the upper end of the post comprising at least one ledge member supporting the area of a disc adjacent the central aperture thereof, means at the upper end of the post for sensing the wall defining the central aperture of a disc supported by said ledge member, means extending through the post connected at the upper end to the sensing means and having abutment means at the lower end adapted to cooperate with said cycling control means, said abutment means being maintained out of the path of movement of said cycling control means by engagement of said sensing means with the wall of a record, means operative during a cycling movement to withdraw the ledge member from beneath the record and coordinately withdraw the sensing finger from the wall of the record to leave the record disc free to drop along the post without restraint, and means for biasing said sensing means in a direction toward a record disc wall and simultaneously biasing the abutment means into the path of movement of the cycling control means, said abutment means being actually movable into the path of the cycling control means upon the absence of a record on the ledge member and during the continued cycling movement of the drive control means.

8. In a phonograph of the automatic record disc changer type and wherein each of the records has a central aperture defined by a circular wall, a turntable having a vertical post, supporting and dispensing means at the upper end of the post for supporting a stack of records with the post within the central hole of the records, and for dispensing them one by one for movement down the post to record playing position, additional means at the upper end of the post for sensing a record on the supporting and dispensing means by engagement with the circular wall, means biasing said sensing means to and beyond wall engaging position, drive means connected to said turntable, control means therefor, cyclic means to operate said control means including a part movable through a cycle for each record dispensing operation, said cyclic means being normally ineffective to operate said control means, abutment means below the post connected to the sensing means and normally out of the path of cycling movement of the cyclic means but actually movable into said path upon movement of the sensing means to beyond wall engaging position and continued cyclic movement of the cyclic means, and means mounting the cyclic means whereby the same is rendered effective to operate the control means upon movement of said cyclic means when said abutment means is in the path of movement of said cyclic means.

9. In a phonograph of the automatic record disc changer type and wherein each of the records has a central aperture defined by a circular wall, a turntable having a vertical post supporting and dispensing means at the upper end of the post for supporting a stack of records with the post within the central holes of the records, and for dispensing them one by one for movement down the post to record playing position, additional means at the upper end of the post for sensing a record on the supporting and dispensing means by engagement with the circular wall, means biasing said sensing means to and beyond wall engaging position, drive means connetced to said turntable, control means therefor, cyclic means to operate said control means including a part movable through a cycle for each record dispensing operation, means connected with the record dispensing mechanism for withdrawing the sensing means from contact with the circular wall upon each dispensing operation to thereby freely permit a previously supported record to freely move down the post and the records thereabove to move down to new positions, said cyclic means being normally ineffective to operate said control means, abutment means below the post connected to the sensing means and normally out of the path of cycling movement of the cyclic means but actually movable into said path upon movement of the sensing means to beyond wall engaging position, and continued cyclic movement of the cyclic means and means mounting the cyclic means whereby the same is rendered effective to operate the control means upon movement of said cyclic means when said abutment means is in the path of movement of said cyclic means.

10. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, an oscillatable arm beneath the turntable movable coordinately with a dispensing operation and having a face movable toward and from the abutment means, said face carrying a pivoted switch control arm, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to whereby enable the control arm to slidably pivot on the same and a cause the free end thereof to operate the controlling element of the switch.

11. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, said abutment means having a groove lying in a horizontal plane in the periphery thereof, an oscillatable arm beneath the turntable movable coordinately with a dispensing operation and having a face movable toward and from the abutment means, said face carrying a pivoted switch control arm, the abutment means, when held elevated by reason of the sensing means engaging a record being held out of the path of movement of the switch control arm, the free end of said control arm being close to the controlling element of the switch and being normally ineffective to operate the same, said abutment means when in the lowered position due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means.

12. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, said abutment means having a groove lying in a horizontal plane in the periphery thereof, an oscillatable arm beneath the turntable movable coordinately with a dispensing operation and having a face movable toward and from the abutment means, said face carrying a pivoted switch control arm, said control arm being mounted on the pivot for vertical movement, the abutment means, when held elevated by reason of the sensing means engaging a record, being held out of the path of movement of the switch control arm, the free end of said control arm being close to the controlling element of the switch and being normally ineffective to operate the same, said abutment means when in the lower position, due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means.

13. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, said abutment means having a groove lying in a horizontal plane in the periphery thereof, an oscillatable arm beneath the turntable movable coordinately with a dispensing operation and having a face movable toward and from the abutment means, said face carrying a pivoted switch control arm, said control arm being mounted on the pivot for vertical movement, means resiliently urging said control arm downwardly on its pivot, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means.

14. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, an oscillatable arm beneath the turntable moveable coordinately with a dispensing operation and having a face movable toward and from the abutment means, said face carrying a pivoted switch control arm, means resiliently retaining said control arm on the oscillatable arm so that it is normally perpendicular to said face, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to slidably pivot on the same and cause the free end thereof to operate the controlling element of the switch.

15. In a phonograph of the automatic record disc changer type, a turntable having a central vertical post, means for driving the turntable comprising a motor, a switch controlling said motor, the switch having a controlling element, a dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, said abutment means having a groove lying in a horizontal plane in the periphery thereof, an oscillatable arm beneath the turntable movable coordinately with a dispensing operation and having a face movable toward and from the abutment means, said face carrying a pivoted switch control arm, means resiliently retaining said control arm on the oscillatable arm so that it is normally perpendicular to said face, said control arm being mounted on the pivot for vertical movement, means resiliently urging said control arm downwardly on its pivot, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means.

16. In a phonograph of the automatic record disc changer type, a turntable having a central vertical post, means for driving the turntable comprising a motor, a switch controlling said motor, the switch having a controlling element, dispensing means for supporting records and dispensing them one at a time for movement down along the post to playing position, a record sensing mechanism adjacent the level of the top of the post for sensing the presence of records on the dispensing means, means biasing said sensing means to and beyond sensing position, a control member extending down to a position beneath the turntable connected at its upper end with the sensing means and having an abutment means at the lower end thereof, an oscillatable arm beneath the turntable movable coordinately with a dispensing operation and having a face movable toward and from the abutment means, said face carrying a pivoted switch control arm, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to slidably pivot on the same and cause the free end thereof to operate the controlling element of the switch, and normally open switch means shunting the switch, said switch means being closable to again start the motor after stoppage thereof.

17. In a phonograph of the automatic record disc changer type, a turntable having a central vertical post, means for driving the turntable comprising a motor, a switch controlling said motor, the switch having a controlling element, dispensing means on the post for supporting records and dispensing them for movement down along the post to playing position, a record sensing mechanism supported by the post adjacent the level of the top of the post for sensing the presence of records on the dispensing means, means biasing said sensing means to and beyond sensing position, a control member extending vertically through the post to a position beneath the turntable connected at its upper end with the sensing means and having an abutment means at the lower end thereof, an oscillatable arm beneath the turntable movable coordinately with a dispensing operation and having a face movable toward and from the abutment means, said face carrying a pivoted switch control arm, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to slidably pivot on the same and cause the free end thereof to operate the controlling element of the switch.

18. In a phonograph of the automatic record disc changer type, a turntable having a central vertical post, means for driving the turntable comprising a motor, a switch controlling said motor, the switch having a controlling element, dispensing means on the post for supporting records and dispensing them for movement down along the post to playing position, a record sensing mechanism supported by the post adjacent the level of the top of the post for sensing the presence of records on the dispensing means, means biasing said sensing means to and beyond sensing position, a control member extending vertically through the post to a position beneath the turntable connected at its upper end with the sensing means and having an abutment means at the lower end thereof, said abutment means having a groove lying in a horizontal plane in the periphery thereof, an oscillatable arm beneath the turntable movable co-ordinately with a dispensing operation and having a face movable toward and from the abutment means, said face carrying a pivoted switch control arm, the abutment means, when held elevated by reason of the sensing means engaging a record, being held out of the path of movement of the switch control arm, the free end of said control arm being close to the controlling element of the switch and being normally ineffective to operate the same, said abutment means when in the lowered position, due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means.

19. In a phonograph of the automatic record disc changer type, a turntable having a central vertical post, means for driving the turntable comprising a motor, a switch controlling said motor, the switch having a controlling element, dispensing means on the post for supporting records and dispensing them for movement down along the post to playing position, a record sensing mechanism supported by the post adjacent the level of the top of the post for sensing the presence of records on the dispensing means, means biasing said sensing means to and beyond sensing position, a control member extending vertically through the post to a position beneath the turntable connected at its upper end with the sensing means and having an abutment means at the lower end thereof, said abutment means having a groove lying in a horizontal plane in the periphery thereof, an oscillatable arm beneath the turntable movable coordinately with a dispensing operation and having a face movable toward and from the abutment means, said face carrying a pivoted switch control arm, means resiliently retaining said control arm on the oscillatable arm so that it is normally perpendicular to said face, said control arm being mounted on the pivot for vertical movement, means resiliently urging said control arm downwardly on its pivot, the abutment means, when held elevated by reason of the sensing means engaging a record, being held out of the path of movement of the switch control arm, the free end of said control arm being close to the controlling element of the switch and being normally ineffective to operate the same, said abutment means when in lowered position, due to the absence of a record to be sensed by the sensing means, lying within the path of movement of the control arm to thereby enable the control arm to engage in the groove of the abutment means and to slidably pivot on the abutment means and cause the free end thereof to operate the controlling element of the switch, said groove in the abutment means maintaining the control arm in switch opening position notwithstanding the raising of the abutment means due to movement of the sensing means, and normally open switch means shunting the switch, said switch means being closable to again start the motor after stoppage thereof.

20. In a phonograph of the automatic record disc changer type wherein the records each have a central aperture, a turntable having a central post, drive means for rotating the turntable, a cycling control means for said drive means operative below the post, said control means being set into operation at the end of each playing of a record, record dispensing means at the upper end of the post comprising at least one ledge member supporting the area of a disc adjacent the central aperture thereof, means at the upper end of the post for sensing the wall defining the central aperture of a disc supported by said ledge member, means extending through the post connected at the upper end to the sensing means and having abutment means at the lower end adapted to cooperate with said cycling control means, said abutment means being maintained out of the path of movement of said cycling control means by engagement of said sensing means with the wall of a record, means operative during a cycling movement to withdraw the ledge member from beneath the record and coordinately withdraw the sensing finger from the wall of the record to leave the record disc free to drop along the post without restraint, means for biasing said sensing means in a direction toward a record disc wall and simultaneously biasing the abutment means into the path of movement of the cycling control means, said abutment means being actually movable into the path of the cycling control means upon the absence of a record on the ledge member and during the continued cycling movement of the drive control means, said drive means having a drive stopping control arm, said abutment means comprising a spool and said cycling control means comprising a slidable fulcrum lever sweeping over a segment of a circle, said lever being pivoted at one end to a movable element and vertically shiftable on its pivot, the free end of said lever swinging when engaged in the narrower portion of the spool and operative upon the drive stopping control arm to effect stoppage of the drive means.

References Cited in the file of this patent

UNITED STATES PATENTS

| | | |
|---|---|---|
| 2,435,264 | Ansar | Feb. 3, 1948 |
| 2,634,135 | Carson | Apr. 7, 1953 |
| 2,707,639 | Vistain | May 3, 1955 |
| 2,763,487 | Fortune | Sept. 18, 1956 |

FOREIGN PATENTS

| | | |
|---|---|---|
| 377,173 | Great Britain | Jan. 16, 1931 |
| 549,635 | Great Britain | Dec. 1, 1942 |
| 253,046 | Switzerland | Nov. 1, 1948 |